April 28, 1964     F. O. OTTOSEN     3,130,532
MOWER
Filed March 17, 1961     5 Sheets-Sheet 1
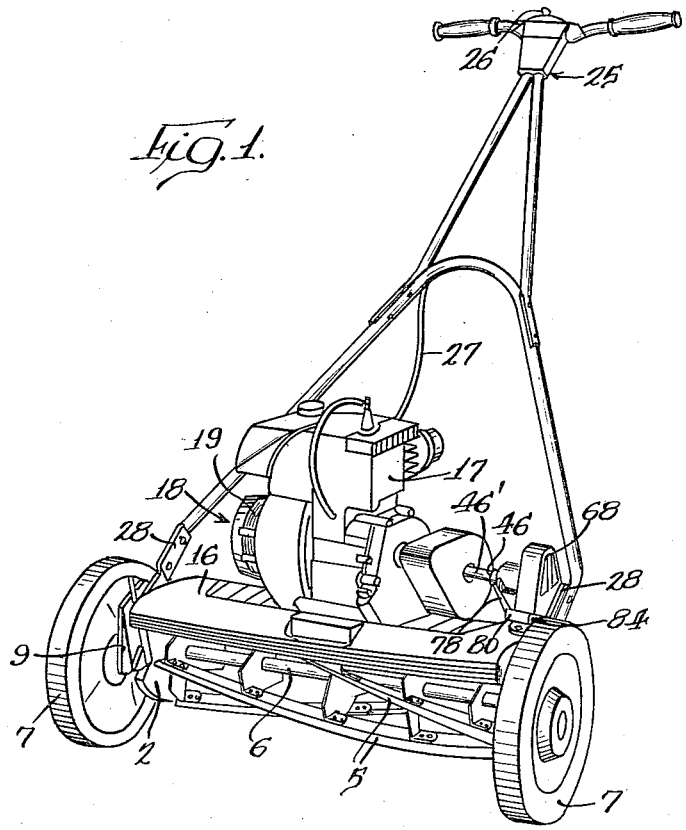
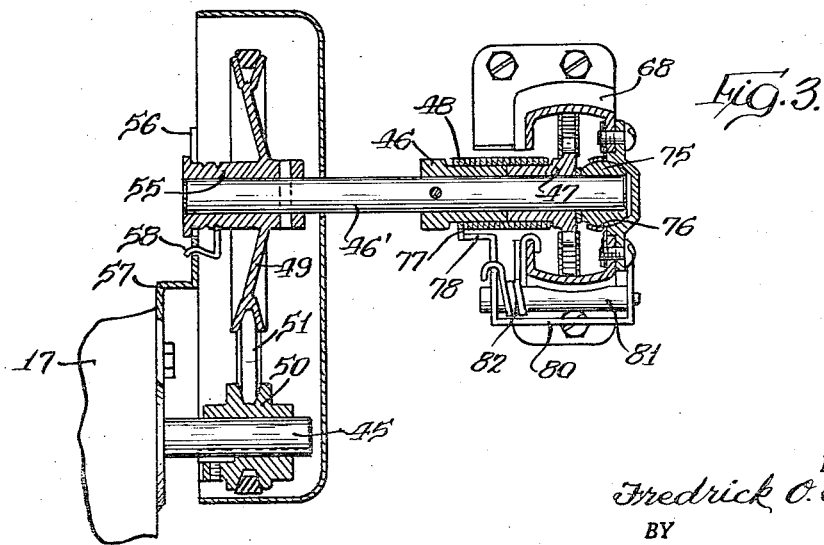
INVENTOR:
Fredrick O. Ottosen
BY
George R. Clark    atty

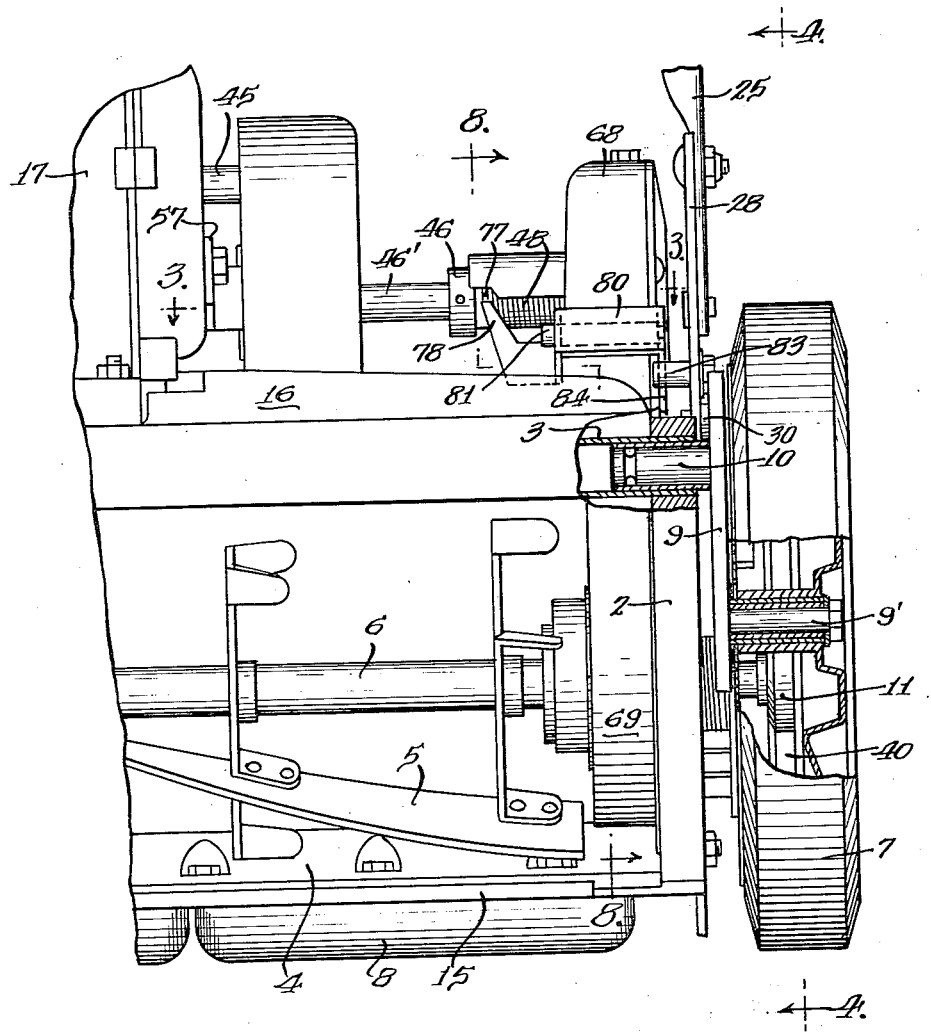

April 28, 1964   F. O. OTTOSEN   3,130,532
MOWER
Filed March 17, 1961   5 Sheets-Sheet 3
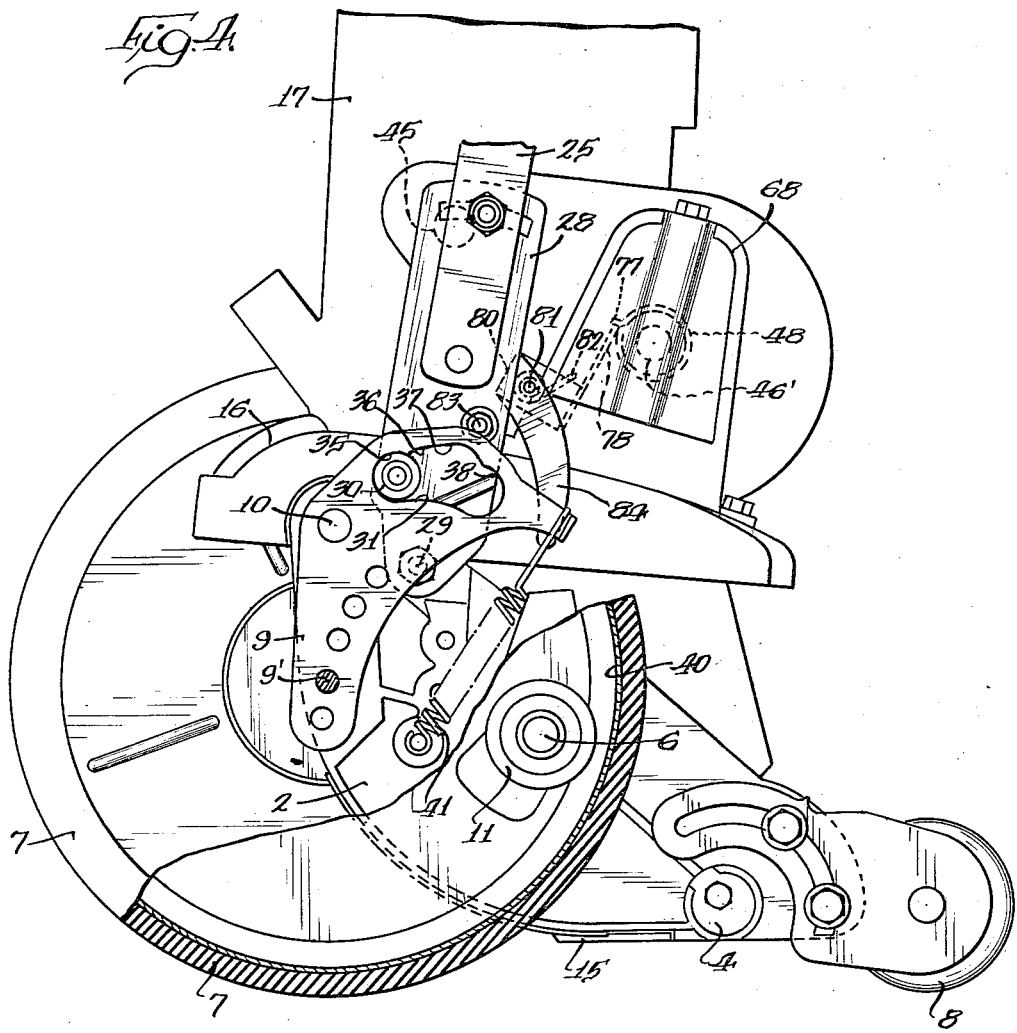
INVENTOR:
Fredrick O. Ottosen
BY
George R. Clark
Atty

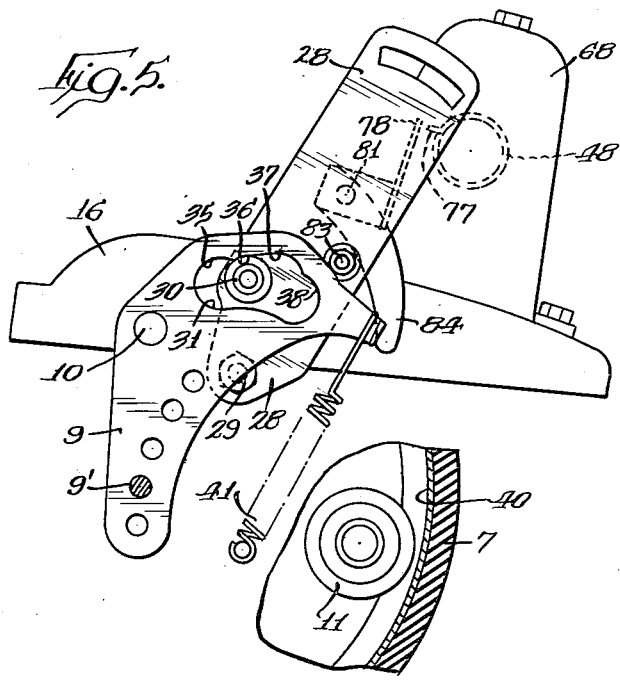
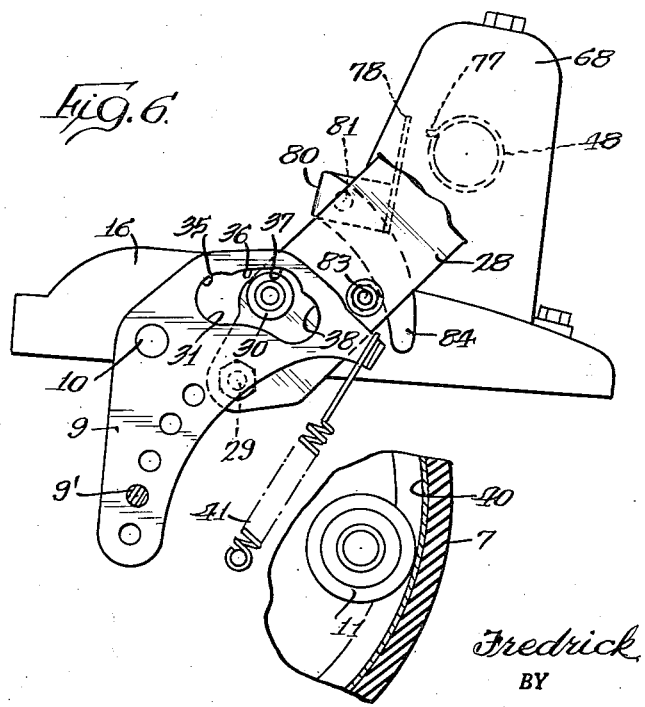
INVENTOR:
Fredrick O. Ottosen
BY
George R. Clark
Atty

April 28, 1964  F. O. OTTOSEN  3,130,532
MOWER
Filed March 17, 1961  5 Sheets-Sheet 5

INVENTOR:
Fredrick O. Ottosen
BY
George F. Clark  Atty

United States Patent Office 3,130,532
Patented Apr. 28, 1964

3,130,532
MOWER
Fredrick O. Ottosen, Chicago, Ill., assignor to Sunbeam Corporation, Chicago, Ill., a corporation of Illinois
Filed Mar. 17, 1961, Ser. No. 96,514
11 Claims. (Cl. 56—26)

This invention relates to an improved mower, and more particularly, to improvements in mowers for mowing lawns and the like.

The invention will be described in connection with a reel type lawn mower in which the reel cutter and ground wheels are powered by an internal combustion engine. However, in its broadest aspects the invention is useful in other types of mowers.

In one prior art form of the above-mentioned reel type mower, the drive and no-drive connection between the engine and the reel cutter is controlled by a foot operated clutch, and the drive and no-drive connection for the ground wheels is controlled by a guide handle operated clutch.

A clutch for the reel cutter is desirable for starting up operations. The reel cutter imposes a load on the engine which is started by pulling on a starter pull cord of the engine starter mechanism. Therefore, in starting up it is desirable to disconnect the reel cutter.

However, the above set forth arrangement of a foot operated reel clutch and a handle operated ground wheel clutch has several disadvantages. Obviously, from the standpoint of simplification and low cost, it is better to have a single control for both clutches rather than two separate controls if the single control will perform all the functions of the two separate controls. A further and more serious disadvantage of the foot and handle control arrangement, however, is that it does not provide maximum safety if the controls are not operated correctly and attentatively.

For instance, after the engine is started in operating the clutch pedal there is a danger that the operator's foot will slip onto the reel cutter if he is inattentative. Additionally, before starting up the engine the operator may neglect to disengage the clutch for the reel. In starting up conventionally the operator places his foot on the rear roller of the mower to brace it and then pulls on the starter cord. The starter cord is pulled forceably and if the reel clutch is still engaged, the operator's foot may accidentally slip into the rotating reel. The handle may have been moved to its extreme up position to disengage the ground wheels and provide space for pulling rearwardly on the starter cord. However, the handle does not control the reel, and at the time the wheels are disengaged before starting up the engine, the operator may forget to move the reel clutch to disengaged position. In any event, the foot clutch pedal is conventionally located adjacent the rear of the mower deck near the exposed reel and this is not an ideal location for the reel clutch control from the standpoint of safety of operation. It would be much better to have the reel clutch controlled by means which is located at a safe distance from the reel so that there is no danger whatsoever for the operator's hands or feet to come in contact with the reel.

Accordingly, it is an object of the invention to provide an improved mower which will overcome the above-mentioned disadvantages of the prior art.

It is a further object of the invention to provide an improved clutch for mowers.

It is a further object of the invention to provide improved control means for mowers.

It is a further object of the invention to provide an improved clutch and clutch control for the power driven cutter of reel type mowers.

It is a further object of the invention to provide a single drive and no-drive control for the power driven cutter and ground wheels of lawn mowers.

It is a further object of the invention to provide an improved lawn mower in which the drive and no-drive conditions of the cutter and ground wheels are controlled by movement of the mower handle.

It is a further object of the invention to provide an improved clutch control in power lawn mowers which will provide maximum safety for the operator.

It is a further object of the invention to provide an improved reel type mower in which the engaged and disengaged conditions of the cutter and ground wheels with respect to a power means for driving the same is controlled by the selective positioning of a multi-position guide handle for the mower.

Briefly, in the preferred form of the invention a multi-position guide handle is provided for the power mower, which handle is used to control drive engaging and disengaging means for the cutter. The drive engaging and disengaging means for the cutter comprises an uncomplicated and low cost wrap around spring clutch for end-to-end driving and driven shaft elements. Furthermore, in the preferred form of the invention, the handle is also used to control drive engaging and disengaging means for the ground wheels. The cutter is a reel type cutter, and the ground wheels are engaged and disengaged with respect to rollers on the reel shaft to provide a clutch for the ground wheel drive. Both clutches are controlled by selective movement of the handle, and the clutches are correlated with the various positions of the handle to drive just the cutter or the cutter and the ground wheels together.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings,

FIG. 1 is a perspective view of a lawn mower incorporating the invention;

FIG. 2 is an enlarged broken away front elevation view of the right-hand part of the mower of FIG. 1;

FIG. 3 is a sectional view taken along the line 3—3 of FIG. 2;

FIG. 4 is a sectional view taken along the line 4—4 of FIG. 2 with the parts illustrated in the reel and ground wheel no-drive condition;

FIG. 5 is a broken away view similar to FIG. 4 with the parts illustrated in the reel drive and ground wheel no-drive condition;

FIG. 6 is a view similar to FIG. 5 with the parts shown in the reel and ground wheel drive condition;

Figure 7:
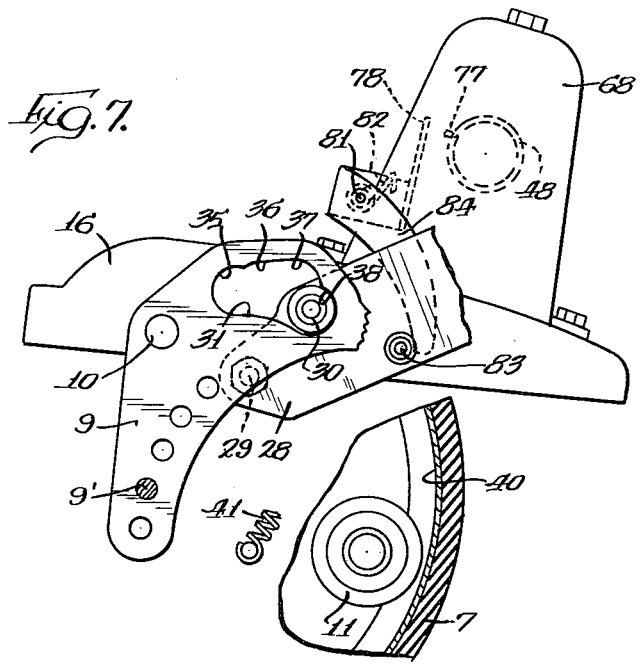
FIG. 7 is a view similar to FIG. 5 with the parts shown in another reel drive and ground wheel no-drive condition.
Figure 8:
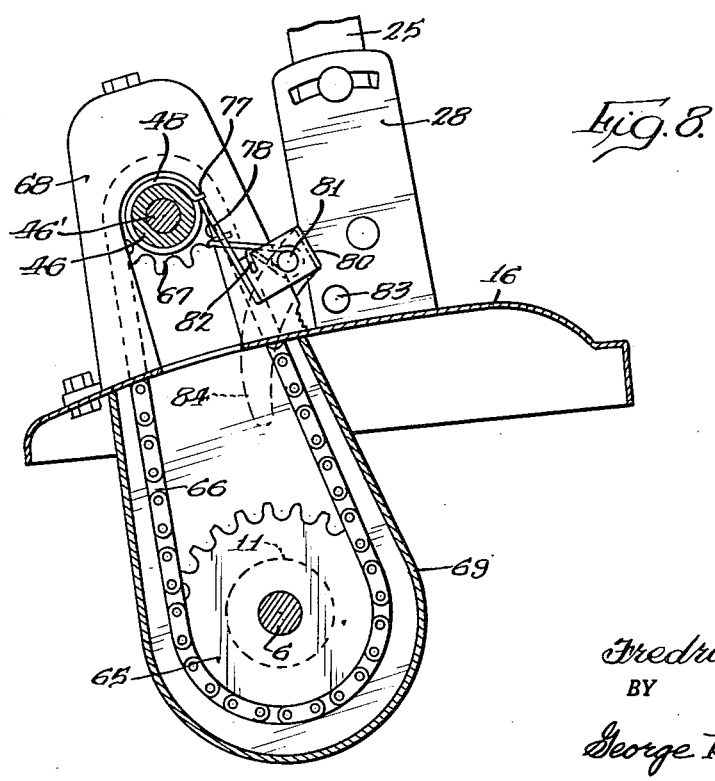
FIG. 8 is a broken away sectional view taken along the line 8—8 of FIG. 2.

In the form of the invention illustrated in the drawings, the mower comprises a frame which has a pair of side plates or members 2 which are connected together by front and rear cross members 3 and 4, respectively. Reel type cutter blades 5 are supported from the shaft 6 of a reel type cutter, which shaft 6 is rotatably supported at its opposite ends in the side plates 2. The frame 2—4 is supported on a pair of ground wheels 7 and rear roller means 8. The ground wheels 7 are positioned adjacent the front of the mower. Ground wheels 7 are rotatably supported in a pair of ground wheels support plates 9 as by wheel bearing pins 9'. The ground wheel support plates 9 are pivotally mounted on the frame by pivot pins 10 or the like connected thereto which enter the front cross member 3, said cross member 3 being hollow or tubular. Thus, the ground wheels 7 are pivotally supported with respect to the frame 2—4. As will be described hereinafter movement of the ground wheels 7 with respect to drive rollers 11 on opposite ends of the reel shaft 6 controls the drive or no-drive condition of the ground wheels.

The rear cross member 4 supports a cutter bar 15 which is in shear engagement with the cutter blades 5. The height at which grass is to be cut is determined by the adjustable position of the roller means 8 and the ground wheels 7. The cutter bar 15 can also be adjusted for wear and the like and additionally the position of the reel in the frame can also be adjusted. These adjusting means form no part of the instant invention and do not need to be understood to comprehend the instant invention and therefore will not be described herein. These adjusting means are described in detail in copending Jepson and Lill patent application Serial No. 773,456, filed November 12, 1958, for Power Operated Lawn Mower, now Pat. No. 3,035,386, issued May 22, 1962, and assigned to the same assignee as the instant application.

A deck or platform 16 is supported on the frame 2—4. Disposed on this deck 16 is an internal combustion engine designated generally by the reference numeral 17. Engine 17 has a starter mechanism 18 which is operated by a manual pull cord 19, as will be obvious to those skilled in the art.

The mower has a handle 25 which is connected at its lower end to the mower and extends therefrom in a generally rearward and upward direction. The upper end of handle 25 has a choke and throttle control lever 26 thereon which is used for controlling starting and stopping of the engine as well as the speed thereof, the lever 26 being connected to the engine 17 by a control cable 27.

The handle 25 is a movable multi-position handle. It is connected to the mower by a pair of handle brackets 28. The handle brackets 28 are pivotally connected at their lower ends to the side plates 2 between the side plates 2 and the ground wheel support plates 9 by suitable pivot means 29. One or both of the handle brackets 28 have cam rollers 30 connected thereto. The cam rollers 30 operate in specially configured cam slots 31 formed in the ground wheel support plates 9 or only one of them if only one cam roller 30 is used. More particularly, the upper edges of the cam slots 31 have distinct concave surfaces 35, 36, 37 and 38 formed therein. The handle 25 is movable to position the rollers 30 in either of these concaved surfaces. As will be described hereinafter in greater detail, when the rollers 30 are positioned in the surfaces 35 the reel and ground wheels are in a no-drive condition with respect to the engine. When the rollers are positioned in surfaces 36 the reel is in a drive condition and the ground wheels are in a no-drive condition. Positioning of the rollers 30 in the surfaces 37 causes the ground wheels to be driven by the engine along with the reel, and positioning of the rollers in surfaces 38 disengages the ground wheels with respect to the engine but the reel continues to be driven by the engine. Positioning of the rollers 30 in the surfaces 35 is an engine start position inasmuch as the ground wheels as well as the reel are disengaged from with respect to the engine. That is to say, the load of the reel is not imposed on the engine in this position when the engine starter mechanism is operated by pulling rearwardly on the pull cord 19.

The rollers 11 which are connected to the opposite ends of reel shaft 6 are adapted to make drive engagement with the inner rims 40 of the wheels 7 when the latter are pivoted in the proper direction. Springs 41 interconnect the rear ends of the ground wheel support plates 9 and the side plates 2 of the frame to cause the support plates 9 to pivot in a rearward direction. When the rollers 30 are disposed in either of the curved surfaces 36 or 38 and then moved to the curved surface 37, the support plates 9 are freed for pivotal movement in a rearward direction so as to cause the ground wheel rims 40 to become engaged with the drive rollers 11. When the rollers 30 are disposed in either of the surfaces 35, 36, or 38, the support plates 9 are pivoted in a forward direction against the action of spring 41 to disengage the ground wheels from the drive rollers 11.

The means for driving the reel from the engine 17 will now be described. Engine 17 has an output shaft 45. Disposed adjacent to the output shaft 45 and in spaced and parallel relationship thereto are a pair of driving and driven tubular shaft elements or collars 46 and 47 respectively. Shaft elements 46 and 47 are disposed in end-to-end axial alignment and are coupled to each other at their adjacent ends by a wrap around coiled spring clutch which will be described shortly. A solid shaft 46′ extends through the tubular shaft elements or collars 46 and 47. Shaft element 46 is fixed to shaft 46′ to turn therewith, and the end of shaft 46′ which is disposed adjacent to the engine 17 has a relatively large pulley 49 connected thereto. The engine output shaft 45 has a relatively small pulley 50 connected thereto, and the two pulleys 49 and 50 are connected together by a drive belt 51 to provide a speed reduction means for driving the shaft 46′ by the engine shaft 45.

The end of shaft 46′ which supports the pulley 49 is rotatably journalled in a bearing bushing 55. This bushing 55 is supported in a slot 56 formed in the rear end of a bearing bushing support bracket 57. The bearing bushing 55 is free to move in a rearward direction in the slot 56 and a spring 58 biases the bushing 55 away from the shaft 45. In this manner the belt 51 is automatically tensioned. That is to say, the movable mounting for bushing 55 and the spring 58 provide automatic means for compensating for wear or loosening of the belt or the like. The pulley belt arrangement between the two shafts 45 and 46′ also provides an overload clutch mechanism so that the engine is not stalled should the reel become jammed by a twig or the like caught between the cutter bar 15 and the cutter reel. That is to say, should the reel and cutter bar fail to cut the twig, the pulleys will slip with respect to the belt so that the engine is not overloaded.

The end of reel shaft 6 corresponding to the outer end of the shaft 46′ has a large sprocket 65 connected thereto. The sprocket 65 is connected by a chain 66 to a smaller sprocket 67 connected to the tubular shaft element or collar 47. Accordingly, when the shaft element 46 rotates the shaft element 47 the cutter reel is caused to rotate. The chain and sprockets provide a further speed reduction between the engine and the cutter reel. The sprockets and chain are housed within housing means comprising an upper housing portion 68 which is mounted above the deck 16 and another housing portion 69 which is mounted below the deck 16.

As heretofore stated, the inner end of the driven shaft 46′ for the driving shaft element 46 is rotatably supported in bearing bushing 55. The outer end of shaft 46′ is rotatably supported in a bearing bushing 75 which is mounted in a bearing bushing support 76 which in turn is supported by the upper sprocket housing 68. The two axially aligned driving and driven elements 46 and 47 respectively are collar-like members which are disposed on the driven shaft 46′. The collar 46 is fixed to the shaft 46′ to continuously rotate therewith, whereas the collar 47 is free wheeling on shaft 46′. However, when the wrap around coil spring clutch 48 couples collar 47 to collar 46 the collar 47 will rotate with shaft 46′ and collar 46. The sprocket 67 may comprise an integral portion of driven collar 47 as illustrated in the drawings.

When viewed from the outer end of shaft 46′, the shaft 46′ is driven in a counterclockwise direction. Therefore, so also is collar 46, and collar 47 when it is coupled to collar 46. Collars 46 and 47 have identical outer diameters, and the inner diameter of coil spring 48 is slightly less than the outer diameter of collars 46 and 47 so as to fit snugly thereabout. When viewed from its outer end, the spring 48 is wound inwardly along the length thereof in a counterclockwise direction. Neither of the terminal ends of spring 48 have a direct connection to either of the collars 46 and 47. However, due to the relative diameters between the collars 46 and 47 and the spring 48 and also the direction of winding of spring 48, when collar 46 rotates in a counterclockwise direction it will automatically carry the spring 48 therewith as long as the terminal end 77 of spring 48 is not moved in an unwinding direction by a clutch actuating finger 78. This is because the frictional grab between the outer surface of collar surface 46 and the inner surface of spring 48 tends to turn the spring 48 in a direction so that it tightens itself upon the collar 46. If the collar 46 were rotated in a clockwise direction it would not carry the spring 48 therewith since this direction of rotation is in the unwinding direction of spring 48. When the collar 46 rotates in a counterclockwise direction, the spring 48 is tensioned in a direction so as to cause the turns thereof to more firmly grip the collar 47. Accordingly, as long as the finger 78 is disengaged from the terminal end 77 of spring 48, when the shaft 46' rotates in a counterclockwise direction the elements 46 to 48 will be simultaneously carried therewith. Rotation of collar 47 causes the sprocket 67 thereof to rotate the reel sprocket 65 by virtue of the chain connection 66 therebetween. Therefore, disengagement of the finger 78 from the terminal end 77 of spring 48 is the clutch engaged position for finger 78..

The clutch operating finger 78 in the preferred form of the invention comprises an integral part on the inner leg of a generally U-shaped member 80. Member 80 is pivotally supported adjacent its bight portion on suitable pivot means 81 on the upper sprocket housing portion 68. A spring 82 continuously biases the finger 78 in a clockwise direction when viewed from the outer end of shaft 46'. That is to say, finger 78 is spring biased to a clutch disengaged position wherein the finger 78 engages the terminal end 77 of spring 48. The finger 78 is moved from the clutch disengaged to the clutch engaged position against its spring bias by appropriate movement of the handle 25. This is accomplished by rearward movement of handle 25 to cause a lug, cam or roller 83 carried by the right-hand handle bracket 28 to engage the bottom edge of the opposite leg 84 of U-shaped member 80.

The handle 25 has four positions depending upon in which of the lobed surfaces 35 to 38 the cam 30 is disposed. When the cam 30 is disposed in lobed surface 35 the lug 83 does not engage the leg 84. However, in all other dispositions of the cam 30, the lug 83 engages the leg 84 so as to rotate the finger 78 against its spring bias so as to free the terminal end 77 of spring 48.

As heretofore described, when the cam 30 is disposed in lobed surface 35 this is the start position for handle 25 inasmuch as the wheels 7 are disengaged from the drive rollers 11, and also spring clutch 48 is disengaged so that the reel is in a no-drive position (see FIG. 4). This uppermost position of handle 25 is also the storage position for the mower. After the engine 17 is started by proper operation of choke and throttle control lever 26 and pulling on the cord 19, the handle 25 can be moved from its extreme up position to its next lower position whereby the cam 30 is disposed in lobed surface 36. This will cause lug 83 to raise the leg 84 which results in engagement of clutch 48 (see FIG. 5) and drive connection of the reel with respect to the engine. At this time the ground wheels 9 are not in driven relationship with respect to the engine. However, as the handle 25 is moved to its next lower position, the rims 49 of the ground wheels are gradually engaged with the drive rollers 11 on the reel shaft (see FIG. 6) so that by the time the cams 30 are positioned in the lobed surfaces 37 the ground wheels are being driven simultaneously with the reel by the engine.

The fourth or last lower position of the handle 25 is another reel drive but a no-ground wheel drive position (see FIG. 7).

When the finger 78 is engaged with the terminal end of spring 48 the finger 78 has the effect of unwinding the spring 48. Therefore, rotation of collar 46 does not cause the spring 48 to more firmly wrap itself around collar 47 for simultaneous rotation of the drive sprocket 67. If the terminal end 77 is disposed on the opposite side of shaft 46' from that on which the finger 78 is disposed at the time the handle 25 is moved to its uppermost position to disengage the clutch, the finger 78 will catch the terminal end 77 the next time it comes around with the collar 46 so as to disengage the clutch almost instantaneously with upper movement of handle 25.

It will not be seen that the invention provides a very uncomplicated and low cost engaging and disengaging means or clutch for connecting or disconnecting the cutter of the mower in drive relationship with respect to the power means for the mower. Furthermore, the reel clutch is so correlated with the handle of the mower which operates the engaging and disengaging means or clutch for the ground wheels that a single control is provided for both clutches which is convenient to operate and safe in all respects. In operating the single control or handle, the operator does not need to have his hands or feet in proximity to the reel but both clutches can be operated at a safe distance from the reel by mere manual manipulation of the upper end of the handle 55. Furthermore, inasmuch as the extreme up position of handle 25 is the clutch disengaged position for the reel drive, there is practically no condition under which the reel will be engaged in drive condition during the starting up operation at which time the operator conventionally places his foot against the roller means 8 to brace the mower as he pulls on the starter cord 19. There are several reasons for this. One reason is that for the operator to have sufficient room to bend over and grasp the pull cord and operate the same the handle 25 must be moved out of the way. The out-of-the-way position of the handle is its extreme up position. In other positions of the handle, it is in the way of the operator for ready access to the pull cord 19 and rearward pulling of the same. Furthermore, as will be obvious to those skilled in the art, when the operator pulls on the pull cord besides resting one of his feet against the roller means 8, he will also grasp the handle 25 with his free hand to further brace himself and the mower. In this bent over position of the operator as he pulls on the cord 19 there is a reaction on the handle 25 which causes it to be moved to its first position. This is further security for disengagement of the reel during the starting up operation. Additionally, it will be noticed that the upper edge of the slot 31 which separates the two concave or lobed surfaces 36 and 37 is straight. Lobe 36 is the reel drive and wheel no-drive position of the cam 30 and lobe 37 is the reel and wheel drive position for cam 30. However, in actual fact the drive rollers 11 start to become engaged with the wheels along the straight edge portion separating the two lobed surfaces 36 and 37 and full or firm drive engagement between the rollers 11 and ground wheels is completed at lobed surface 37. This means that the operator cannot leave the mower standing in an engine running reel drive but no-wheel drive condition. If he does the weight of handle 25 will carry the cam 30 from the lobed surface 36 towards the lobed surface 37 which means that the mower will start to move slowly along the ground inasmuch as when the cam 30 is disposed between lobed surfaces 36 and 37 the ground wheels are lightly or partially engaged with the drive rollers 11. Therefore, for the operator to leave the mower in a standing engine running condition, he must consciously move the handle 25 to its first upper position wherein the cams 30 are disposed in the lobed surfaces 35 wherein the clutch 48 is disengaged to disconnect the reel from drive relationship with respect to the engine 17. If the engine 17 is thereafter turned off by operation of the lever 26, this means that the mower is left in an engine start position wherein the reel is disengaged from drive relationship with respect to the engine. Additionally, in storing or putting the mower aside, the user will naturally be inclined to move the handle 25 to its extreme up position in order to conserve storage space. Therefore, in view of the foregoing, it will now be obvious that the invention provides improved drive engaging and disengaging means or clutches for a powered mower along with a single foolproof manual control to provide maximum safety for the operator or user.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In a mower having ground wheels and power driven cutting means, power means, means for connecting and disconnecting the cutting means in drive relationship with the power means, a handle for guiding the mower, the handle comprising the means for controlling the connecting and disconnecting means, the handle being a multi-position handle and controlling the connecting and disconnecting means in accordance with manual movement thereof, the connecting and disconnecting means comprising driving and driven shaft elements which are arranged with respect to each other in end-to-end axial alignment and a clutch interrelating the adjacent ends of the shaft elements, the clutch comprising a coiled spring, the internal diameter of the coiled spring being slightly less than the outer diameter of the adjacent ends of the shaft elements, the opposite ends of the coiled spring surrounding the adjacent ends of the shaft elements, and the coiled spring clutch being controlled by movement of the handle.

2. In a mower having power driven ground wheels and power driven cutting means, power means, means for connecting and disconnecting the ground wheels and cutting means in drive relationship with the power means, the means for connecting and disconnecting the cutting means being operable independently of the means for connecting and disconnecting the ground wheels, a handle for guiding the mower, the handle comprising the means for controlling all the connecting and disconnecting means, the handle being a movable multi-position handle and comprising essentially the sole manual means for controlling all the connecting and disconnecting means in accordance with the position of the handle, the connecting and disconnecting means for the cutting means comprising driving and driven shaft elements which are disposed with respect to each other in end-to-end axial alignment and a releasable wrap around spring clutch on the adjacent ends of the shaft elements, the clutch being controlled by movement of the handle.

3. In a mower as in claim 2, wherein the clutch comprises a coiled spring, the internal diameter of the coiled spring being slightly less than the outer diameter of the adjacent ends of the shaft elements, the opposite ends of the spring being disposed about the adjacent ends of the shaft elements, and handle actuated means for engaging and disengaging the clutch.

4. In a lawn mower, a frame, a reel type cutter rotatably supported in the frame, a pair of ground wheels, the frame being supported on the ground wheels, power means on the frame, means for connecting and disconnecting the cutter in drive relationship with the power means, a handle for guiding the mower, the handle being movably mounted and comprising essentially the sole manually operative means for controlling the connecting and disconnecting means in accordance with the position thereof, the connecting and disconnecting means comprising driving and driven shaft elements which are disposed with respect to each other in end-to-end axial alignment, speed reduction drive means and overload protective means interconnecting the driving shaft element and the power means, the reel type cutter having a reel shaft, speed reduction drive means interconnecting the driven shaft element and the reel shaft, and a clutch interrelating the adjacent ends of the driving and driven shaft elements, the clutch comprising a coiled spring, the internal diameter of the coiled spring being slightly less than the outer diameter of the adjacent ends of the driving and driven shaft elements, opposite ends of the coiled spring surrounding the adjacent ends of the driving and driven shaft elements, and means actuated by movement of the handle for engaging and disengaging the coiled spring clutch.

5. In a lawn mower as in claim 4, wherein the coiled spring is connected to the adjacent ends of the driving and driven shafts solely by the coiled spring tension thereof, and the handle actuated means for engaging and disengaging the coiled spring clutch comprises means operated by the handle for moving one terminal end of the coiled spring toward and away from one of the adjacent ends of the driving and driven shaft elements.

6. In a lawn mower, a frame, a reel type cutter rotatably supported in the frame, a pair of ground wheels, the frame being supported on the ground wheels, power means on the frame, the reel type cutter having a rotary reel shaft, means for connecting and disconnecting the reel shaft in drive relationship with respect to the power means, means for connecting and disconnecting the ground wheels in drive relationship with respect to the reel shaft, a handle for guiding the mower, means for actuating the first mentioned means independently of the second mentioned means, the actuating means comprising the handle and a movable mounting therefor for selective movement thereof to actuate the first mentioned means independently of the second mentioned means, the first mentioned means comprising driving and driven shaft elements which are disposed with respect to each other in end-to-end axial alignment and a releasable wrap around spring clutch joining the adjacent ends of the driving and driven shaft elements, the second mentioned means comprising friction roller means on the reel shaft and means for engaging and disengaging the ground wheels and friction roller means with respect to each other, and the means for actuating both the first and second mentioned means comprising the movable handle.

7. In a lawn mower, a frame, a reel type grass cutter, said cutter having a reel shaft, the reel shaft being rotatably supported in the frame, a pair of ground wheels, the frame being supported on the ground wheel, a handle for guiding the mower, an internal combustion engine on the frame for driving the reel shaft and ground wheels, a starter mechanism for the engine, a pull cord for manually operating the starter mechanism, a first clutch mechanism for engaging and disengaging the reel shaft in drive relationship with the engine, a second clutch mechanism for engaging and disengaging the ground wheels in drive relationship with the reel shaft, manual control means for operating said clutch mechanism, said manual control means comprising said handle, said first clutch mechanism comprising a pair of shaft elements which are disposed in end-to-end axial alignment and a releasable spring coiled about the adjacent ends of the shaft elements for frictional engagement therewith, and said second clutch mechanism comprising roller means on said reel shaft and means for moving said ground wheels and roller means into frictional engagement and disengagement with respect to each other.

8. In a lawn mower, a frame, a reel type grass cutter, said cutter having a reel shaft, the reel shaft being rotatably supported in the frame, a pair of ground wheels, the frame being supported on the ground wheels, a handle for guiding the mower, an internal combustion engine on the frame for driving the reel shaft and ground wheels, a starter mechanism for the engine, a pull cord for manually operating the starter mechanism, a first clutch mechanism for engaging and disengaging the reel shaft in drive relationship with the engine, a second clutch mechanism for engaging and disengaging the ground wheels in drive relationship with the reel shaft, manual control means for operating said clutch mechanisms, said manual control means comprising said handle, said first clutch mechanism comprising a pair of shaft elements which are disposed in end-to-end axial alignment and a releasable spring coiled about the adjacent ends of the shaft elements for frictional engagement therewith, one of said shaft elements being driven by an output shaft of said engine through pulley and belt speed reduction means, and the reel shaft being driven by the other shaft element by chain and sprocket speed reduction means.

9. A power operated lawn mower having a source of power thereon, and ground supporting wheels and a cutter, a first clutch means between the source of power and the wheels and a second clutch means between the source of power and the cutter, a single control handle, and means on said handle connected to each of said clutches for actuating said clutches in sequence to cause actuation and deactuation of said wheels and said cutter.

10. In a lawn mower as in claim 9, wherein said lawn mower is a reel type lawn mower, said single control handle having a pivotal mounting on said lawn mower and extending rearwardly thereof for manually guiding said lawn mower, and said means on said handle connected to each of said clutches being operated by pivotal movement of said handle about its pivotal mounting.

11. In a lawn mower as in claim 10, wherein said reel type lawn mower has a reel type cutter including a rotary shaft and cutter blades mounted thereon, said first clutch means being between said shaft and ground supporting wheels, and said second clutch being between said shaft and source of power.

References Cited in the file of this patent
UNITED STATES PATENTS

| | | |
|---|---|---|
| 1,966,972 | Seeley | July 17, 1934 |
| 2,247,333 | Funk | June 24, 1941 |
| 2,736,389 | Phelps | Feb. 28, 1956 |
| 2,886,934 | Jepson | May 19, 1959 |
| 2,924,055 | Clemson | Feb. 9, 1960 |